United States Patent [19]

Bell

[11] 4,361,420
[45] * Nov. 30, 1982

[54] GAS FLAME TORCH SYSTEM WITH FLASH ARRESTERS

[76] Inventor: Theodore F. Bell, 400 Fentress Blvd., Daytona Beach, Fla. 32014

[ * ] Notice: The portion of the term of this patent subsequent to Jan. 20, 1998, has been disclaimed.

[21] Appl. No.: 204,336

[22] Filed: Nov. 5, 1980

Related U.S. Application Data

[60] Division of Ser. No. 42,132, May 24, 1979, Pat. No. 4,246,002, which is a continuation of Ser. No. 874,807, Feb. 3, 1978, abandoned, which is a continuation of Ser. No. 710,861, Aug. 2, 1976, abandoned.

[51] Int. Cl.³ .............................................. F23D 13/46
[52] U.S. Cl. ...................................... 431/346; 48/192
[58] Field of Search .......................... 48/192; 222/189; 431/346; 220/88 R, 88 A; 137/533.11, 533.13, 533.15; 251/368

[56] References Cited

U.S. PATENT DOCUMENTS

| | | | |
|---|---|---|---|
| 1,139,959 | 5/1915 | Fausek | 431/346 |
| 1,262,431 | 4/1918 | Backstrom | 431/346 |
| 1,901,217 | 3/1933 | Yerkes et al. | 137/533.13 |
| 2,274,968 | 3/1942 | O'Bannon | 137/533.13 |
| 2,482,457 | 9/1949 | Boedecker | 48/192 |
| 2,695,628 | 11/1954 | Wheildon | 251/368 |
| 2,981,285 | 4/1961 | Nilo | 137/533.13 |
| 3,059,667 | 10/1962 | Coceano | 137/533.13 |
| 3,264,718 | 8/1966 | Paul | 251/368 |
| 3,373,766 | 3/1968 | Doerfler | 137/533.13 |
| 3,767,164 | 10/1973 | Robinson | 251/368 |
| 4,246,002 | 1/1981 | Bell | 48/192 |

Primary Examiner—Peter F. Kratz
Attorney, Agent, or Firm—Barnes, Kisselle, Raisch & Choate

[57] ABSTRACT

For use in a welding system which uses combustible gases and the like, a flash arrester comprising a main body having an opening therethrough and including a frusto-conical seat, and a ball cage body positioned in the main body and having an axial opening therein. The ball cage body has a frusto-conical seat complementary to the first-mentioned seat of the main body. The other end of the ball cage body has axially extending slots to provide spaced axially extending fingers. The fingers have frusto-conical surfaces. A ball seat member is provided on the other end of the main body and has a frusto-conical ball seat. A ceramic ball is provided between the fingers and is freely movable between the second valve seat and the ball seat.

4 Claims, 6 Drawing Figures

GAS FLAME TORCH SYSTEM WITH FLASH ARRESTERS

This application is a division of co-pending application Ser. No. 6/042,132 filed May 24, 1979, now U.S. Pat. No. 4,246,002 issued Jan. 20, 1981, which in turn is a continuation of prior co-pending application Ser. No. 874,807 filed Feb. 3, 1978, now abandoned, which in turn is a continuation of prior co-pending application Ser. No. 710,861 filed Aug. 2, 1976, now abandoned.

This invention relates to systems which use flammable gases such as oxygen and acetylene for welding and particularly to flash arresters for such systems.

BACKGROUND OF THE INVENTION

In systems which utilize flammable gases such as oxygen and acetylene for welding as by a torch, one of the problems that may often occur is that the flame tends to flash back toward the source of oxygen or acetylene. Accordingly, it has become necessary to interpose devices which are in the nature of check valves in the lines that extend back to the source. Such devices are commonly known as flash arresters.

Among the problems are that the flash arresters often utilize materials that are destroyed by the heat in the passage of the flame back toward the source so the flash arrester is thereafter no longer effective. The temperatures encountered may be 1000° F. or more. For example, flash arresters utilize springs, rubber O-rings and the like, which are destroyed. A more serious problem is that the operator often does not know that there has been a flashback and the flash arrester has been destroyed so that there is generally no warning that the flash arrester is no longer operable.

Accordingly, among the objects of the invention are to provide a flash arrester which is made and designed so that it will withstand the temperatures involved without destruction so that it can be reusable; which can be operated at varying angles required; and which utilizes a minimum number of parts.

SUMMARY OF THE INVENTION

In accordance with the invention, the flash arrester comprises a main body having an opening therethrough and including a frusto-conical seat adjacent one end, and a ball cage body having an axial opening therein, and having a frusto-conical portion complementary to the first mentioned seat of said main body. The other end of the ball cage body has axially extending slots to provide spaced axially extending fingers. The opening through the ball cage body has a second frusto-conical seat on the fingers. A ball seat member is threaded into the other end of the main body, and has a frusto-conical ball seat. A ceramic ball is freely movable within the fingers between the second valve seat and the ball seat.

DESCRIPTION

Figure 1:
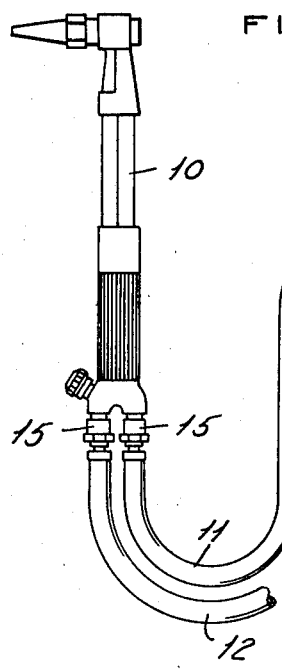
FIG. 1 is a partly diagrammatic view showing the invention applied to a typical welding system.
Figure 2:
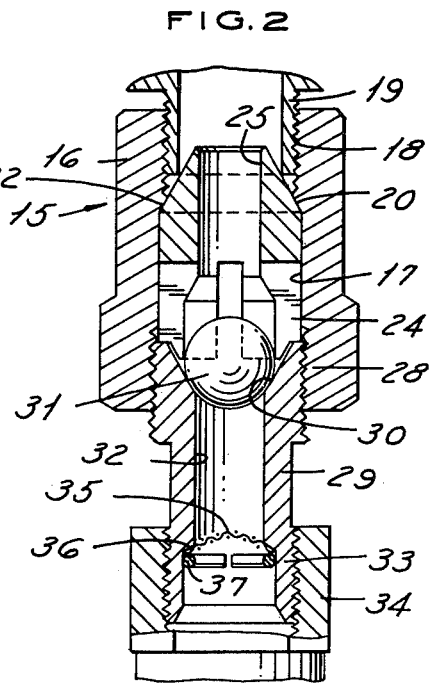
FIG. 2 is a fragmentary longitudinal sectional view on an enlarged scale through a flash arrester embodying the invention.
Figure 3:
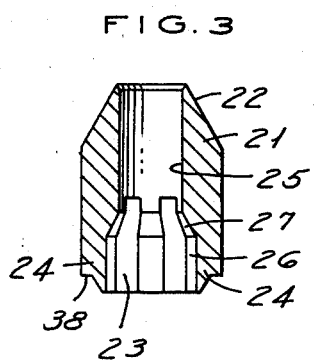
FIG. 3 is a sectional view of part of the valve arrester taken along the line 3—3 in FIG. 4.
Figure 4:
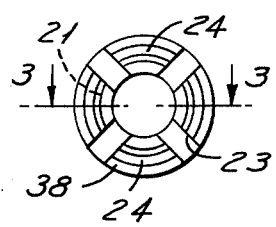
FIG. 4 is a bottom end view of the part shown in the FIG. 3.
Figure 5:
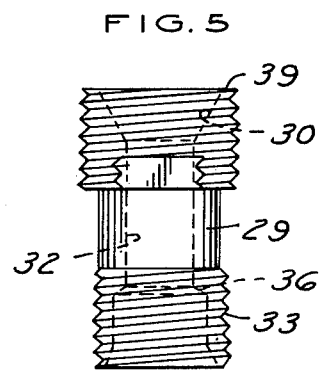
FIG. 5 is a side elevational view of another part of the flash arrester.
Figure 6:
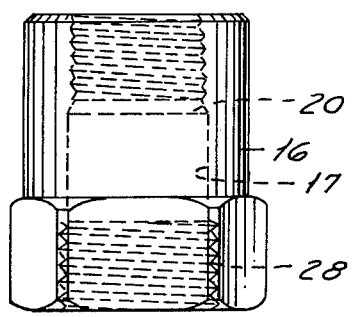
FIG. 6 is a side elevational view of a further part of the flash arrester.

Referring to FIG. 1, in a typical welding system, torch 10 is supplied with flammable gases such as oxygen and acetylene through lines 11, 12 from suitable sources, one of which is shown at 13. Flash arresters 15 are interposed between the torch and the source. Alternatively, where a distributor block is utilized to supply the torch, the flash arresters 15 may be provided between the distributor block and the source.

Referring to FIGS. 2-6, each flash arrester 15 comprises a main body 16 that has an axial opening 17 therethrough. The upper end of the main body 16 is threaded as at 18 for engagement with a fitment 19 on the torch or distributor body. The opening 17 is formed intermediate its ends with a frusto-conical seat 20 forming an angle of preferably 30° with the axis of the opening 19.

A cage element or body 21 is inserted in the opening 17 and has substantially the same diameter as the lower portion of the opening 17. The cage element 21 includes a frusto-conical end portion or surface 22 that has the same angle as the valve seat 20 and is adapted to engage the valve seat 20. The lower end of the cage element is provided with axial slots 23 forming fingers 24 and an opening 25 extends through the member 21. The lower end 26 of opening 25 adjacent the fingers 24 is enlarged and connected to the upper end of the opening 25 by a frusto-conical surface 27 on each finger.

The lower end of the main body 15 (FIG. 2) is threaded as at 28 to receive the upper end of a ball seat member 29 that has a frusto-conical ball seat 30. A ceramic ball 31 is provided in the area between the fingers 24 and the seat 30. The seat member 29 includes an axial opening 32 extending from the seat through the member 29. The lower end of the seat member 29 is threaded as at 33 to receive the fitment 34 of a supply hose or the like. A screen 35 is provided adjacent a shoulder 36 in the lower end of the opening 29 and is held therein by a snap ring 37.

Each finger 24 includes an external radial shoulder 38 which is engaged by the end 39 of ball seat member 29.

The ball 31 is made of a ceramic material such as aluminum oxide having the following mechanical properties:

| | |
| --- | --- |
| Tensile Strength (77° F.) | 28,000 psi |
| Tensile Strength (1832° F.) | 15,000 psi |
| Compressive Strength (77° F.) | 330,000 psi |
| Compressive Strength (1832° F.) | 140,000 psi |
| Hardness (Rockwell) | 45 N 81 |
| Modulus of Elasticity | 52,000,000 psi |
| Density | 0.139 lb./in.$^3$ |
| Specific Gravity | 3.80-3.84 |
| Maximum Useful Temp | 3180° F. |
| Water Absorption | Nil |
| Magnetic Properties | Non-Magnetic |

The ball diameter is preferably 1.5 times the orifice diameter formed by opening 25. The area formed by the slots 23 is preferably 25-35% less than the orifice area.

The ball is preferably made within a tolerance of ±0.0001.

The distance between the inclined surfaces 27 of the ball cage element and the ends of the fingers 24 is such that the bottom of the ball 31 is flush with the end of the cage element 21 when the ball is against surfaces 27.

The various parts of the flash arrester except for the ball are made of a metal which is capable of withstanding the temperatures involved such as aluminum, yellow brass or stainless steel. The screen is preferably made of stainless steel and the retaining ring is preferably made of stainless steel wire.

In use, the normal movement of the torch will not be adversely affected by movement of the ball 31 since the ball 31 is made of such lightweight material that it will not interfere with the flow of gases toward the torch. In other words, the pressure of gases is sufficient to keep the ball away from the valve seat 30.

However, should a flashback occur, the ball 31 is immediately moved toward the valve seat 30 preventing flame from passing toward the source. When the torch is again used, the flash arrester will continue to be effective since none of the parts will have been adversely affected by the high temperature of the flashback.

In a typical flash arrester, the following dimensions have been found to be effective:

| | |
|---|---|
| Ball diameter | .3750 |
| Angle of ball seat 20 | 30° |
| Angle of ball seat 22 | 30° |
| Angle of ball seat 30 | 30° |
| Diameter of opening 25 | .25 |

In describing the flash arrester, terms such as "top", "bottom" and the like have been utilized and it should be understood that these are merely terms of description and not limitation.

I claim:

1. For use in a system where combustible gases are utilized as in welding and the like, a gas flame torch system comprising a first supply line adapted to be coupled to a source of a flammable gas and a second supply line adapted to be coupled to a source of gaseous oxygen or the like to support combustion of said flammable gas, a gas flame torch, and first and second flash arresters interposed in gaseous communication between said first and second supply lines respectively and said torch and operable to arrest flash backs to the associated supply line on a repetitive basis, each said flash arrester comprising a main body, a ball cage body, a ball seat member and a lightweight ceramic ball, said main body, ball cage body, ball seat member and ceramic ball being made of a material capable of withstanding welding flame temperatures, said main body having an opening extending axially therethrough, said ball cage body being fixedly secured within said through opening of said main body with a close fit therein, said ball cage body having an axial passage therethrough defined at one end by axially extending slots to provide spaced axially extending fingers, each said finger having a frusto-conical surface adjacent the base thereof defining a first ball seat interrupted by spaces formed by said slots, the orifice area formed by said slots being less than the orifice area of said axial passage downstream of said first ball seat, said ball seat member being secured in said axial through-opening of said main body and having an opening extending axially therethrough with an uninterrupted frusto-conical surface in said axial through-opening of said ball seat member defining a second ball seat juxtaposed to said first ball seat by a distance greater than the diameter of said ball and being defined by forced abutment of the free ends of said fingers with said ball seat member whereby said fingers extend along the travel path of said ball to guide free movement of the same between said seats and said ball remains partially in said ball cage body when seated on said second ball seat, said ceramic ball having substantially the same diameter as the opening defined radially between and adjacent said fingers and a greater diameter than that of said axial passage downstream of said first ball seat, the interior space between said first and second ball seats being empty except for said ceramic ball such that said ceramic ball is freely movable axially between said second and first ball seats to thereby function as a lightweight, wear and flame resistance flash arresting back check valve without the use of a valve biasing spring, said opening through said ball seat member including a screen interposed therein upstream of said second ball seat and retaining means holding said screen in position therein, said screen and retaining means being made of a material capable of withstanding welding temperatures.

2. The torch system set forth in claim 1 wherein said opening through said ball seat member includes a counterbore having an enlarged diameter upstream of said second ball seat of said ball seat member, said
   screen being interposed in said counterbore,
   said retaining means comprising a retaining ring holding said screen in position in said counterbore.

3. The torch system set forth in claim 1 wherein said ball is made of aluminum oxide.

4. The torch system set forth in claim 1 wherein said ball is made of a material having the following mechanical properties:

| | |
|---|---|
| Tensile Strength (77° F.) | 28,000 psi |
| Tensile Strength (1832° F.) | 15,000 psi |
| Compressive Strength (77° F.) | 330,000 psi |
| Compressive Strength (1832° F.) | 140,000 psi |
| Hardness (Rockwell) | 45 N 81 |
| Modulus of Elasticity | 52,000.000 psi |
| Density | 0.139 lb./in.$^3$ |
| Specific Gravity | 3.80–3.84 |
| Maximum Useful Temp | 3180° F. |
| Water Absorption | Nil |
| Magnetic Properties | Non-Magnetic |

* * * * *